United States Patent [19]

Murdock et al.

[11] 4,092,627
[45] May 30, 1978

[54] CALIBRATION CIRCUIT FOR EXPENDABLE SONOBUOYS

[75] Inventors: Donald Murdock; Thomas E. Stixrud, both of San Diego, Calif.

[73] Assignee: The United States of America as represented by the Secretary of the Navy, Washington, D.C.

[21] Appl. No.: 755,710

[22] Filed: Dec. 30, 1976

[51] Int. Cl.² ...................... H04B 11/00; H04R 29/00
[52] U.S. Cl. ......................................... 340/2; 340/5 C
[58] Field of Search .................................... 340/5 C, 2

[56] References Cited

U.S. PATENT DOCUMENTS 3,875,548  4/1975  Acks .................................. 340/5 C X

OTHER PUBLICATIONS

Markus, Guidebook of Electronic Circuits, McGraw-Hill Book Co., 1974, p. 952.

Primary Examiner—Richard A. Farley
Attorney, Agent, or Firm—Richard S. Sciascia; Ervin F. Johnston; Thomas Glenn Keough

[57] ABSTRACT

Calibration of expendable sonobuoys can be made in-situ to assure the transmission of representative data. A pair of integrated circuit timers are coupled together to provide on-off duty cycles during which a spectral distribution of calibration signals is fed to the sonobuoy. Since the spectral distribution and amplitude of the calibration signals are known, a remote monitoring station is continuously apprised of the sonobuoy's calibration.

3 Claims, 1 Drawing Figure

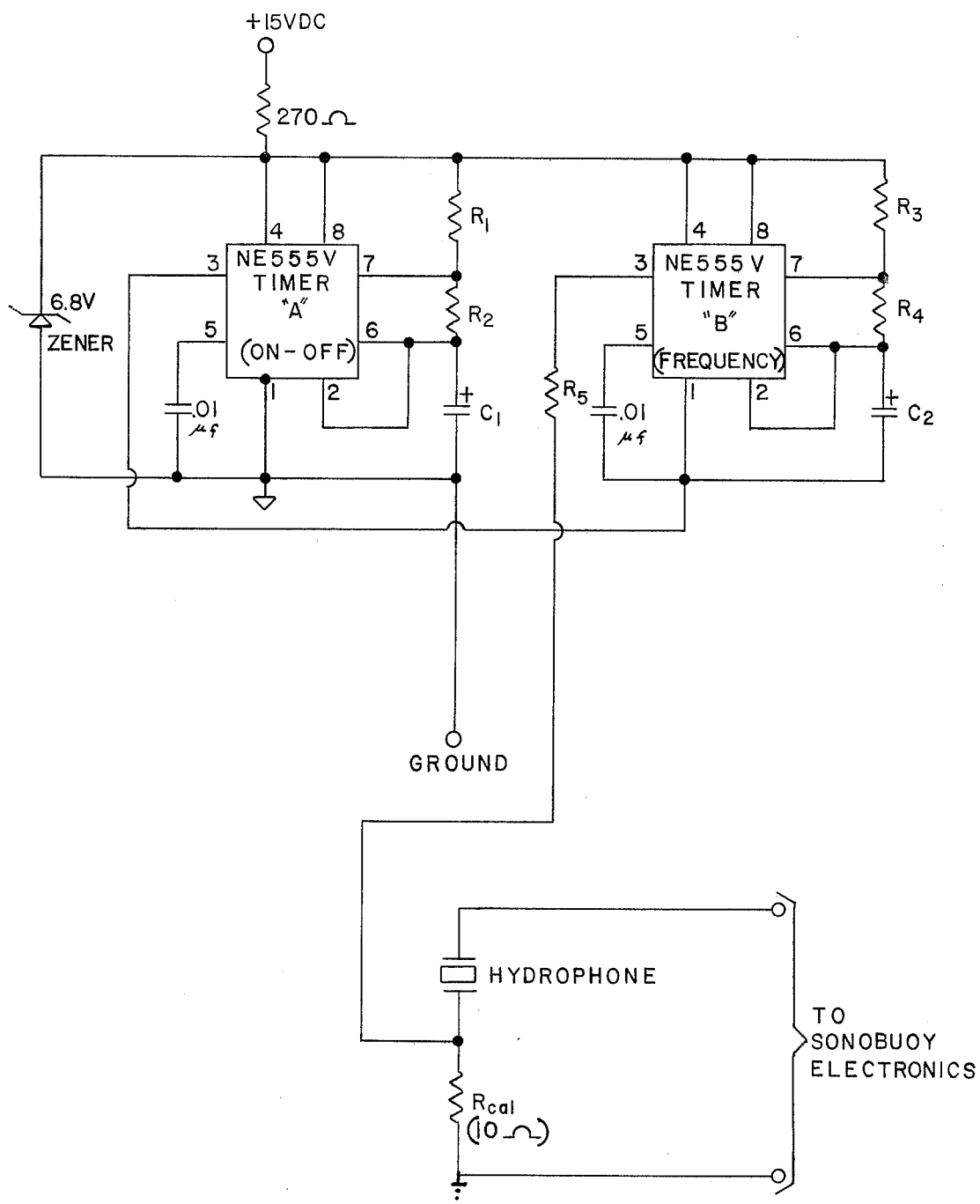

CALIBRATION CIRCUIT FOR EXPENDABLE SONOBUOYS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Expendable sonobuoys and related monitoring devices typically are the victims of long periods of storage. After a long-shelf time, it is not uncommon for the sonobuoy sensors and the electronics to deteriorate or otherwise fail. Changes in acoustic or electronic sensitivities can reduce their effectiveness for data gathering or detection purposes. Technicians usually perform routine testing and maintenance at predetermined intervals. Test equipment is plugged into modules on the units and readings representative of the spectral distributions and amplitudes of signals of interest are observed. While this inspection procedure reveals some equipments' failures, it cannot indicate if components have become defective in the period between the last inspection and the actual use of a sonobuoy unit. Most assuredly, this calibration technique cannot detect faulty components in a sonobuoy after it has been deployed and is gathering data. Thus, there is a continuing need in the state-of-the-art for a calibration unit which is compact and highly reliable to allow its inclusion with expendable sonobuoys to allow the calibration thereof for and during deployment.

SUMMARY OF THE INVENTION

The present invention is directed to providing an improvement for an expendable sonobuoy having a hydrophone coupled to an electronics package. Calibration before and during deployment is assured by a compact means for initiating a series of off-on duty cycles. A second compact means is coupled to the initiating means for generating a spectrally distributed signal of predetermined frequencies and amplitudes when the initiating means is in the on portion of the duty cycle. The known amplitude of the calibration signals is coupled to a small resistor in series with the hydrophone to enable the verification of the reliability of the entire sonobuoy system including all the receiving and recording equipment at a remote monitoring station.

An object of the invention is to provide an improved calibration for a data gathering system.

Another object is to provide a calibration unit for an expendable sonobuoy.

Still another object is to provide a circuit for permitting calibration of an expendable sonobuoy before and during its deployment.

Yet another object is to provide a compact calibration circuit which permits calibration of a sonobuoy during its deployment.

Another object is to provide a calibration circuit coupled to a sonobuoy's power supply which does not overly drain the supply.

These and other objects of the present invention will become more readily apparent from the drawings when taken with the ensuing specification.

BRIEF DESCRIPTION OF THE DRAWING

The drawing sets forth a schematic representation of the invention.

DESCRIPTION OF THE PREFERRED EMBODIMENT

Referring now to the drawing, the sonobuoy calibrator is formed from an on-off timer A and a frequency timer B. These two timers preferably are NE-555 integrated circuit timers of the type commercially marketed by the Signetics Corporation of Inglewood, California.

The two integrated circuit timers are designed to be connected to a 15 volt DC power supply. Because the calibration circuit is compact and does not appreciably drain the power supply, it is coupled to the batteries of the sonobuoy. Thus, the circuit can calibrate during the deployment of the sonobuoy or it can be disconnected from the sonobuoy and therefore can function as a calibration unit for any number of sonobuoys prior to deployment. However, because of the compactness, relatively low cost and low power drain of the two timers and their associated components, it has been found expedient to include a calibrator with each sonobuoy.

The on-off duty cycle of the calibrator is determined by timer A. The "off" time can be determined by the equation:

$$t_1 = k(R_1 + R_2)C_1 \tag{1}$$

where $t_1$ is expressed in seconds, $k = 0.685$ (a characteristic of this particular integrated circuit timer), $R_1$ and $R_2$ are stated in ohms and $C_1 =$ microfarads.

The "on" time can be represented by the equation $$t_2 = k(R_2)C_1 \tag{2}$$

where $t_2$ is expressed in seconds $k = 0.685$, $R_2$ and $C_1$ are expressed in ohms and microfarads respectively.

Presetting the timer A with a 17 minute (1020 seconds) "off" cycle ($t_1$) and a 1 minute (60 seconds) "on" cycle ($t_2$) has been found to be sufficient to calibrate the sonobuoy during deployment. The magnitude of $C_1$ can be an arbitrary choice and has been selected as being 180 microfarads. Substituting in equation (1) above:

$$1020 = 0.685(R_1 + R_2)180 \times 10^{-6}$$

and yields the equation:

$$R_1 + R_2 = 8.27 \times 10^6 \text{ ohms} \tag{3}$$

Substitution in equation (2) above:

$$60 = 0.685(R_2)180 \times 10^{-6}, \text{ and}$$

$$R_2 = 0.487 \times 10^6 \text{ ohms}.$$

When this is the value of $R_2$, by equation (3):

$$R_1 = (8.27 - 0.487) \times 10^6 = 7.783 \times 10^6 \text{ ohms} \tag{4}$$

Now that the magnitudes of $R_1$ $R_2$ and $C_1$ have been established to provide a one minute (60 seconds) "on" portion of the duty cycle and a 17 minute (1,020 seconds) "off" portion of the duty cycle, it remains only to establish the calibration signal for the frequency timer B.

One family of expendable sonobuoys has been found to respond satisfactorily to a 10 hertz square wave calibration signal. The period, T, is the sum of its "on" duty cycle $t_3$ and its "off" duty cycle $t_4$ and equals 0.1 second. $C_2$ has a value of 0.047 microfarads and $R_3 << R_4$ to make $t_3$ approximately equal to $t_4$ to assure that a square wave calibration signal is generated.

In this case $$t_3 = 0.685 (R_3 + R_4) C_2 \quad (5)$$

and with $R_3 << R_4$ this relationship is expressed as being $$t_3 = 0.685 (R_4) C_2 = t_4 \quad (6)$$

Therefore, the on duty cycle $t_3$ is $$0.05 = 0.685 (R_4) 0.047 \times 10^{-6} \quad (7)$$

so that
$$R_4 = 1.55 \times 10^6 \text{ ohms.} \quad (8)$$

In practice $R_3$ must have a finite value such as one thousand ohms for the Signetics integrated circuit timer to function properly. $R_5$ is picked so that the proper voltage appears across $R_{cal}$ due to the voltage divider action of $R_5$ and $R_{cal}$. For the family of transducers calibrated, $R_{cal}$ had the value of ten ohms.

Other values for $R_3$ and $R_4$ are selectable to generate "on" duty cycles, $t_3$ other than 50% for the output of the frequency timer B. These outputs can be shaped to produce waveforms other than square or rectangular waves such as triangular waves, sine waves, etc. The values picked $C_1$ and $C_2$ have some limits and are not completely arbitrary. The same is true for $R_1$, $R_2$, $R_3$, and $R_4$. However, the values can vary over an extremely wide range with proper circuit operation.

Thus, from the foregoing it is apparent that the on-off duty cycles of timer A are determined by the resistors and capacitor connected to the numbers six, seven, eight and one pins of the NE555 timer A. in like manner the resistors and capacitors coupled to the six, seven, eight and one pins of the NE555 timer B determine the frequency of oscillation.

The aforedescribed circuitry lends itself very well to being potted and conveniently packed in a sonobuoy.

Obviously, many modifications and variations of the present invention are possible in the light of the above teachings, and, it is therefore understood that within the scope of the disclosed inventive concept, the invention may be practiced otherwise than specifically described.

What is claimed is:

1. In an expendable sonobuoy having a hydrophone coupled to an electronics package an improved in-situ calibrator is provided comprising:
   means for initiating a series of on-off duty cycles; and
   means coupled to the initiating means for generating spectrally distributed calibrate signals of predetermined frequencies and amplitudes when the initiating means is in the on portion of the duty cycle and for coupling the known calibrate signals of predetermined frequencies and amplitudes to a small resistor in series with the hydrophone to enable a verification of the entire system operation.

2. An improved calibrator according to claim 1 in which the initiating means and the generating means are a pair of integrated circuit timers coupled together.

3. An improved calibrator according to claim 2 in which the integrated circuit timers are NE555's having resistors and capacitors coupled between their six, seven, eight and one pins to provide on-off duty cycles and a square wave.

* * * * *